UNITED STATES PATENT OFFICE.

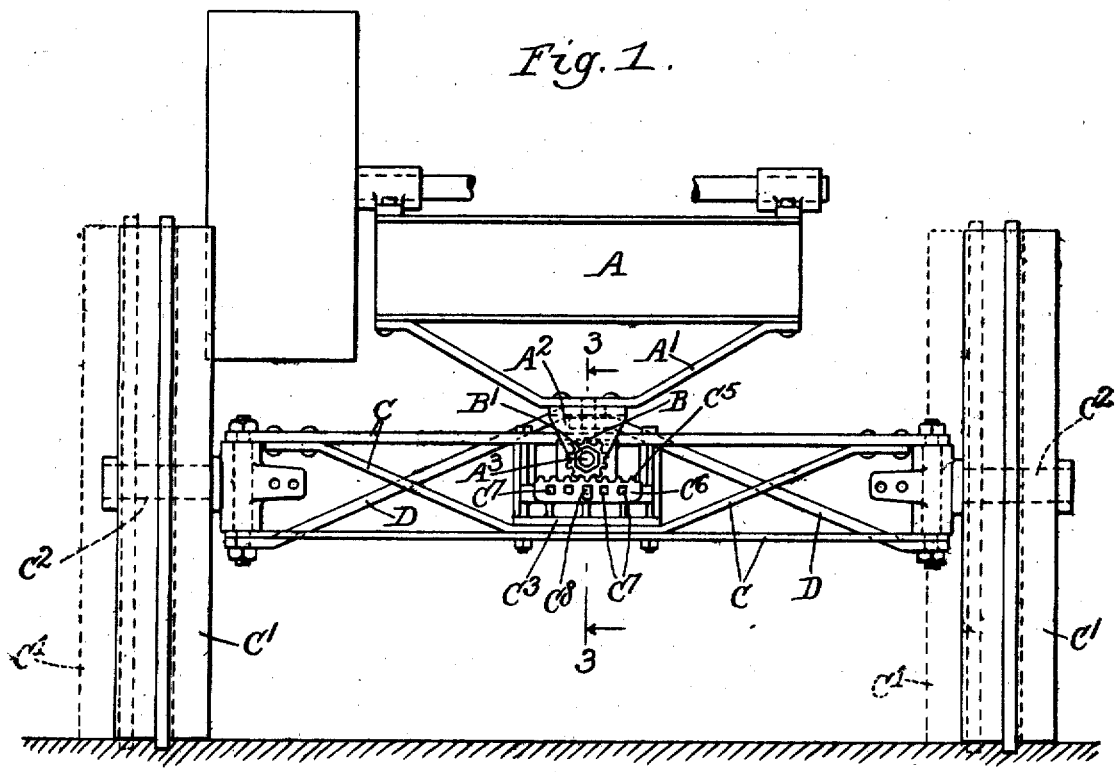

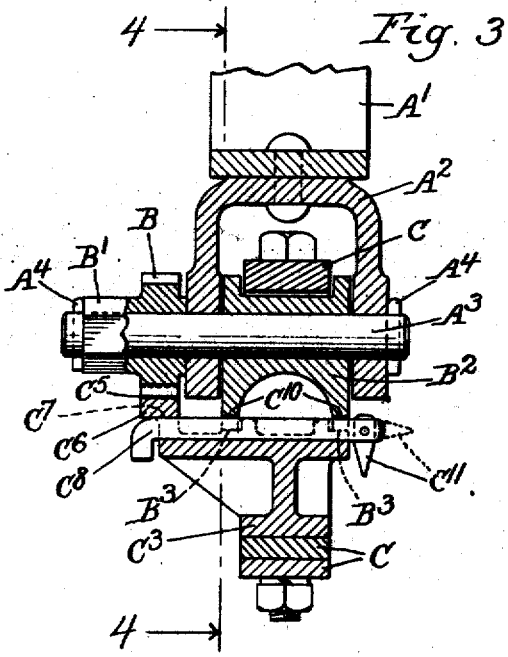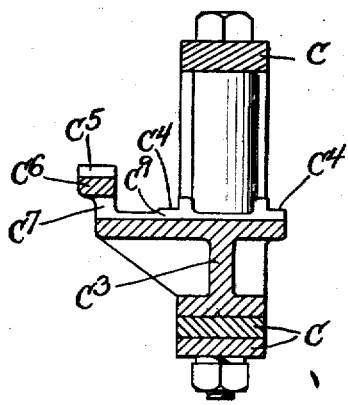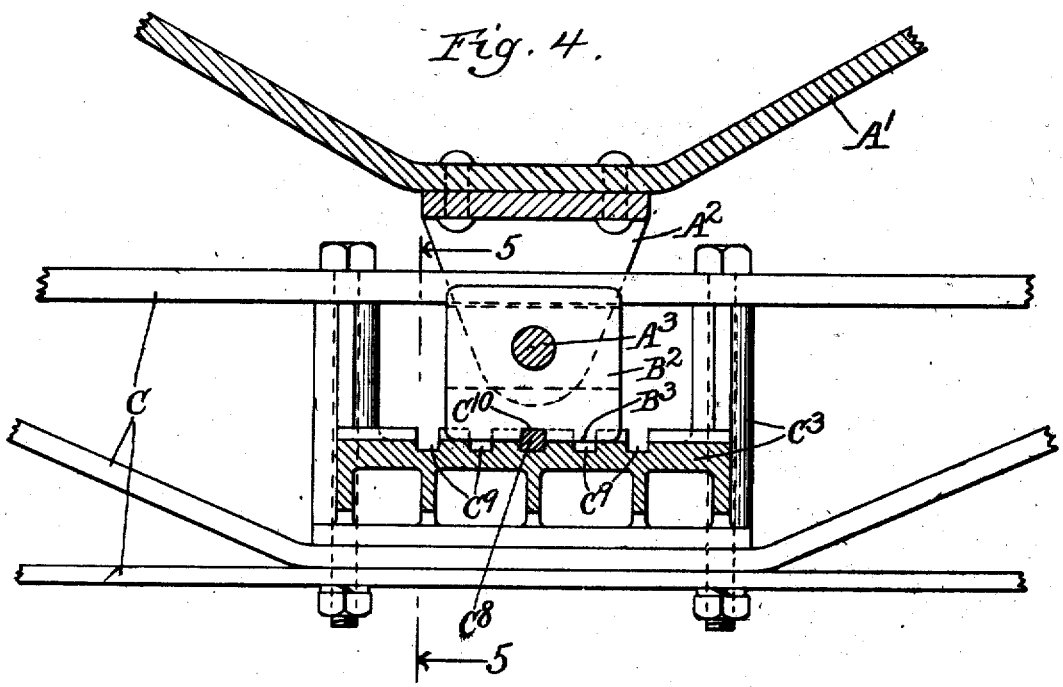

RALPH E. DAVIS, OF LAPORTE, INDIANA, ASSIGNOR TO ADVANCE-RUMELY COMPANY, OF LAPORTE, INDIANA, A CORPORATION OF INDIANA.

ADJUSTABLE FRONT AXLE FOR TRACTORS.

1,317,964.  Specification of Letters Patent.  Patented Oct. 7, 1919.

Application filed February 23, 1918. Serial No. 218,680.

*To all whom it may concern:*

Be it known that I, RALPH E. DAVIS, a citizen of the United States, residing at Laporte, in the county of Laporte and State of Indiana, have invented a certain new and useful Improvement in Adjustable Front Axles for Tractors, of which the following is a specification.

My invention relates to improvements in front axles for tractors and the like and has for one object to provide a new and improved form wherein the front axle is movable laterally with respect to the vehicle.

It is customary when using the belt driving pulley of a tractor to have the belt pass forward. When this is done it is necessary to adopt some special arrangement of front wheels in order to avoid interference by them with the belt. Heretofore it has been the practice either to make the front wheels small enough to allow the belt to clear them or to make the tread wide enough to allow the belt to clear the wheels by passing between one of them and the tractor frame. In either case structural defects appear and the structure as a whole is unsatisfactory. The present invention embodies a structure whereby the entire axle and wheels may be bodily shifted to one side away from their usual running position thereby allowing the belt to clear.

My invention is illustrated more or less diagrammatically in the accompanying drawings wherein—

Figure 1 is a front elevation of a tractor embodying my invention.

Fig. 2 is a skeleton plan view of the same;

Fig. 3 is a section on the line 3—3 of Fig. 1;

Fig. 4 is a section on the line 4—4 of Fig. 3;

Fig. 5 is a detailed section of the center block of the front axle, section being made along the line 5—5 of Fig. 4.

Like parts are indicated by like letters in all the figures.

A is a tractor frame having the downwardly extending supporting member $A^1$ situated beneath its forward end. $A^2$ is a yoke riveted to the supporting member $A^1$ and carrying a pivot pin $A^3$ held in place by the cotter pins $A^4$.

B is a pinion mounted for rotation on the pivot pin $A^4$ and provided with the hexagonal hub $B^1$. $B^2$ is a pivoted bearing block mounted on the pivot pin $A^3$ and longitudinally slotted on its lower side. The slot is bounded by bearing surfaces $B^3$.

C is a built-up axle supported on the steering wheels $C^1$. These steering wheels are rotatably mounted on the spindles $C^2$ and the spindles are themselves rotatably mounted in the end of the axle about a substantially vertical axis as indicated. In other words, this axle and stering wheel assembly is the so-called automobile type. $C^3$ is a fixed bearing block held in position in the center of the axle. It has two parallel longitudinal bearing surfaces or tracks $C^4$, $C^4$ adapted to engage and support the bearing surfaces $B^3$ on the pivoted bearing block. This block is provided with a rack $C^5$ in mesh with the pinion B. This rack $C^5$ is mounted on web $C^6$ perforated as at $C^7$ to permit passage of a holding pin $C^8$ which is adapted to pass through notches $C^9$ in the truck surfaces $C^4$ and through a notch $C^{10}$ in the lower side of the pivoted bearing block whereby when this holding key or pin is in position the bearing block is held against longitudinal movement with respect to the axle. This pin is held in position by a latch $C^{11}$ as indicated.

D, D are radius rods secured to the outer ends of the axle and pivoted at a common center $D^2$ on a cross piece $D^3$ on the vehicle frame whereby the axle is held against rotation with respect to the vehicle frame but free to move longitudinally.

It is evident that while I have shown in my drawings an operative device, still many changes might be made both in size, shape and arrangement of parts without departing materially from the spirit of my invention and I wish therefore that my drawings be regarded as in a sense diagrammatic.

The use and operation of my invention are as follows:—

For normal driving the axle will be centered, the pivot block in a position corresponding to the center of the tractor, the stop pin and the central hole and groove of the center block thus holding the axle in the central position. Such a position, however, does not allow clearance for the belt driven by the belt pulley over the front wheels. When it is desired to use the belt pulley the lock of the stop pin is withdrawn and the stop pin itself is withdrawn. Then by any suitable means such as a wrench the hexagonal head of the pinion is rotated which being in mesh with the rack on the top of the center block will cause it to move to one side. When it is moved a sufficient distance to clear the belt the stop pin will be introduced in one of the side or end holes in the center block and locked in place. In this position the belt will clear the front wheels and the axle although no longer centered still permits of the tractor being driven so as to maneuver it in place for the work of stationary driving.

When this work is completed, the stop pin is again unlocked, and withdrawn, the pinion is rotated in the opposite direction until the center hole of the center block comes in register with the groove in the slide block when it is again introduced and locked in place and the axle is then properly centered and the truck ready for driving.

I claim:

1. The combination with a vehicle frame of an axle mounted free to rotate upon a horizontal axis parallel with the axis of the vehicle, means for holding the axle substantially perpendicular to the central axis of the vehicle frame, and means for moving the vehicle frame and axle bodily with respect one to the other.

2. The combination with a vehicle frame of an axle mounted free to rotate upon a horizontal axis parallel with the axis of the vehicle, means for holding the axle substantially perpendicular to the central axis of the vehicle frame, and means for moving the vehicle frame and axle bodily with respect one to the other in a direction parallel with the axle.

3. The combination with a vehicle frame of an axle mounted free to rotate upon a horizontal axis parallel with the axis of the vehicle, means for holding the axle substantially perpendicular to the central axis of the vehicle frame, and means for moving the vehicle frame and axle bodily with respect one to the other, said means comprising a rack and gear in mesh one with the other mounted one upon the vehicle, the other upon the axle.

4. The combination with a vehicle frame of an axle mounted free to rotate upon a horizontal axis parallel with the axis of the vehicle, means for holding the axle substantially perpendicular to the central axis of the vehicle frame, and means for moving the vehicle frame and axle bodily with respect one to the other in a direction parallel with the axle, said means comprising a rack and gear in mesh one with the other mounted one upon the vehicle the other upon the axle.

5. The combination with a vehicle of an axle and supporting means therefor, a bearing block slidable on the axle and rotatable on the vehicle and means for moving the vehicle and axle with respect one to another.

6. The combination with a vehicle of an axle and supporting means therefor, a bearing block slidable on the axle and rotatable on the vehicle and means for moving the vehicle and axle with respect one to another, a rack on the axle parallel with the path of the slidable bearing block, a pinion on the vehicle in mesh with the rack and means for rotating the pinion to move the bearing block along the axle.

7. The combination with a vehicle of an axle and supporting means therefor, a track on the axle, a rack on the axle, a bearing block slidable on the track pivoted on the vehicle, a gear on the vehicle in mesh with the rack, a pivotal support between the bearing block and the vehicle whereby the block and axle may rotate about a line parallel with the vehicle axis, means for holding the vehicle axle and means for locking the bearing block and track against relative movement.

8. The combination with a vehicle of an axle and supporting means therefor, a track on the axle, a bearing block sliding thereon and rotatable on the vehicle, and means for moving the vehicle and axle with respect one to another.

9. The combination with a vehicle of an axle and supporting means therefor, said axle comprising a plurality of substantially parallel frame members, a track lying within said members, a bearing block sliding therealong and in rotatable relation with the vehicle, and means for moving it along the track.

10. The combination with a vehicle of an axle and supporting means therefor, a track on the axle, a bearing block sliding thereon and rotatable on the vehicle, and means for moving the vehicle and axle with respect one to another, said bearing block having double parallel bearing surfaces and said track having raised portions adapted to engage the edges of said bearing surfaces, to prevent lateral motion across the track.

11. The combination with a vehicle of an axle and supporting means therefor, a track on the axle, a bearing block sliding thereon and rotatable on the vehicle, and means for moving the vehicle and axle with respect one to another, said bearing block having a hollow lower surface, and said track having raised portions adapted to engage said hollow portion to prevent lateral motion across the track.

12. The combination with a vehicle of an axle and supporting means therefor, a track on the axle, a bearing block sliding thereon and rotatable on the vehicle, and means for moving the vehicle and axle with respect one to another, means on said bearing block and said track adapted to coöperate to prevent lateral motion of the block across the track.

In testimony whereof I affix my signature, in the presence of two witnesses, this 14th day of February, 1918.

RALPH E. DAVIS.

Witnesses:
WM. J. BALLANTINE,
JOHN A. SECOR.